United States Patent
Liu

(10) Patent No.: US 12,155,780 B2
(45) Date of Patent: Nov. 26, 2024

(54) BLOCKCHAIN MESSAGE PROCESSING METHOD AND APPARATUS, COMPUTER, AND READABLE STORAGE MEDIUM

(71) Applicant: Tencent Technology (Shenzhen) Company Limited, Shenzhen (CN)

(72) Inventor: Pan Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 370 days.

(21) Appl. No.: 17/721,232

(22) Filed: Apr. 14, 2022

(65) Prior Publication Data

US 2022/0239508 A1 Jul. 28, 2022

Related U.S. Application Data

(63) Continuation of application No. PCT/CN2021/092039, filed on May 7, 2021.

(30) Foreign Application Priority Data

Jun. 3, 2020 (CN) .......................... 202010492628.3

(51) Int. Cl.
*H04L 9/00* (2022.01)
*H04L 9/06* (2006.01)

(52) U.S. Cl.
CPC .............. *H04L 9/50* (2022.05); *H04L 9/0643* (2013.01)

(58) Field of Classification Search
None
See application file for complete search history.

(56) References Cited

U.S. PATENT DOCUMENTS

| 10,536,537 | B1 | 1/2020 | Le et al. |
| 2017/0287068 | A1* | 10/2017 | Nugent ................. G06Q 20/08 |

(Continued)

FOREIGN PATENT DOCUMENTS

| CN | 109525441 A | 3/2019 |
| CN | 109872157 A | 6/2019 |

(Continued)

OTHER PUBLICATIONS

Tencent Technology, WO, PCT/CN2021/092039, Aug. 13, 2021, 5 pgs.

(Continued)

*Primary Examiner* — Joseph P Hirl
*Assistant Examiner* — Hassan Saadoun
(74) *Attorney, Agent, or Firm* — Banner & Witcoff, Ltd.

(57) ABSTRACT

Embodiments of this application disclose a blockchain message processing method performed by a computer device acting as an oracle contract node. The method includes: acquiring service contract information, and adding the service contract information to an oracle contract, the service contract information including a contract identifier of a service smart contract and a service request event corresponding to the service smart contract; acquiring a target off-chain node, and transmitting the service contract information to the target off-chain node through the oracle contract, so that the target off-chain node acquires an event request result corresponding to the service request event; and acquiring the event request result transmitted by the target off-chain node, and returning the event request result to the service smart contract corresponding to the contract identifier.

17 Claims, 9 Drawing Sheets

(56) References Cited

U.S. PATENT DOCUMENTS

| | | | |
|---|---|---|---|
| 2019/0044725 A1* | 2/2019 | Lancashire | H04L 9/3239 |
| 2019/0182028 A1 | 6/2019 | Arquero et al. | |
| 2019/0188399 A1 | 6/2019 | Palaniappan et al. | |
| 2019/0205884 A1* | 7/2019 | Batra | G06Q 20/4014 |
| 2019/0349185 A1* | 11/2019 | Kim | H04L 9/0637 |
| 2020/0250168 A1* | 8/2020 | Xu | G06F 16/2336 |
| 2020/0294143 A1* | 9/2020 | Qiu | H04L 9/50 |
| 2020/0396302 A1* | 12/2020 | Le | H04L 9/3247 |

FOREIGN PATENT DOCUMENTS

| | | |
|---|---|---|
| CN | 111090875 A | 1/2020 |
| CN | 110941859 A | 3/2020 |
| CN | 110992020 A | 4/2020 |
| CN | 111176668 A | 5/2020 |
| CN | 111190714 A | 5/2020 |
| CN | 111212037 A | 5/2020 |
| CN | 111401903 A | 7/2020 |
| JP | 2020515092 A | 5/2020 |
| KR | 20190094188 A | 8/2019 |
| KR | 20190114956 A | 10/2019 |
| KR | 20190119581 A | 10/2019 |
| WO | WO 2019201246 A1 | 10/2019 |

OTHER PUBLICATIONS

Tencent Technology, IPRP, PCT/CN2021/092039, Dec. 6, 2022, 6 pgs.

Tencent Technology, Korean Office Action, KR Patent Application No. 10-2022-7015840, Dec. 4, 2023, 13 pgs.

Tencent Technology, Indian Office Action, IN Patent Application No. 202247024906, Feb. 2, 2023, 8 pgs.

Tencent Technology, ISR, PCT/CN2021/092039, Aug. 13, 2021, 3 pgs.

Tencent Technology, Extended European Search Report and Supplementary Search Report, EP21817273.2, Jul. 27, 2023, 10 pgs.

Tencent Technology, Japanese Office Action, JP 2022556585, Oct. 31, 2023, 8 pgs.

* cited by examiner

BLOCKCHAIN MESSAGE PROCESSING METHOD AND APPARATUS, COMPUTER, AND READABLE STORAGE MEDIUM

CROSS-REFERENCE TO RELATED APPLICATIONS

This application is a continuation application of PCT Patent Application No. PCT/CN2021/092039, entitled "BLOCKCHAIN MESSAGE PROCESSING METHOD AND APPARATUS, COMPUTER AND READABLE STORAGE MEDIUM" filed on May 7, 2021, which claims priority to Chinese Patent Application No. 202010492628.3, filed with the State Intellectual Property Office of the People's Republic of China on Jun. 3, 2020, and entitled "BLOCKCHAIN MESSAGE PROCESSING METHOD AND APPARATUS, COMPUTER, AND READABLE STORAGE MEDIUM", all of which are incorporated herein by reference in their entirety.

FIELD OF THE TECHNOLOGY

This application relates to the field of blockchain technologies, and in particular, to a blockchain message processing method and apparatus, a computer, and a readable storage medium.

BACKGROUND OF THE DISCLOSURE

As blockchain technologies become increasingly mature, along with decentralization and other characteristics of the blockchain, the application of the blockchain has become increasingly widespread. In other words, the biggest core innovation of the blockchain is to resolve trust problems in a decentralized way, so that value transfer is performed without a need to trust or rely on a third-party institution. A smart contract is an important part of the blockchain. The smart contract is a set of contracts defined in digital forms and helps contract participants execute a protocol for completing a task. The smart contract and a decentralized application (Dapp) on the blockchain have interactive requirements for external data. The blockchain cannot actively initiate a network call, and some smart contracts on the chain need to acquire a processing result of an event before subsequent services are further triggered to be executed. The processing result of the event needs to be acquired by a user through the Internet, and be transmitted to a blockchain network as transaction data by the user. However, there is often a lag in autonomously acquiring the processing result of the event by the user, which causes that the smart contract cannot acquire the processing result of the event in time, and affects subsequent service execution, thereby reducing efficiency of blockchain message processing.

SUMMARY

Embodiments of this application provide a blockchain message processing method and apparatus, a computer device, and a readable storage medium.

An aspect of the embodiments of this application provides a blockchain message processing method, performed by a computer device acting as an oracle contract node, the method including:

acquiring service contract information, and adding the service contract information to an oracle contract, the service contract information including a contract identifier of a service smart contract and a service request event corresponding to the service smart contract, further including: acquiring a target service type to which the service request event belongs, and acquiring a target service data set corresponding to the target service type from the oracle contract; and adding the service contract information to the target service data set;

acquiring a target off-chain node, and transmitting the service contract information to the target off-chain node through the oracle contract, so that the target off-chain node acquires an event request result corresponding to the service request event; and acquiring the event request result transmitted by the target off-chain node, and returning the event request result to the service smart contract corresponding to the contract identifier.

An aspect of the embodiments of this application provides a blockchain message processing method, performed by a target off-chain node, the target off-chain node being a computer device, the method including:

acquiring service contract information transmitted by an oracle contract node through an oracle contract, the service contract information including a contract identifier of a service smart contract and a service request event corresponding to the service smart contract;

determining a data acquisition address based on the service request event; and accessing the data acquisition address, acquiring an event request result corresponding to the service request event, and transmitting the event request result to the oracle contract node, so that the oracle contract node feeds back the event request result to the service smart contract corresponding to the contract identifier.

A computer device acting as an oracle contract node is provided, including a memory and one or more processors, the memory storing computer-readable instructions, the computer-readable instructions, when executed by the one or more processors, causing the computer device to perform the operations in the foregoing blockchain message processing methods.

One or more non-transitory computer-readable storage media storing computer-readable instructions are provided, the computer-readable instructions, when executed by one or more processors of a computer device acting as an oracle contract node, causing the computer device to perform the operations in the foregoing blockchain message processing methods.

A computer program product or a computer program is provided, the computer program product or the computer program including computer-readable instructions, the computer-readable instructions being stored in a non-transitory computer-readable storage medium, a processor of a computer device reading the computer-readable instructions from the computer-readable storage medium, and the processor executing the computer-readable instructions, causing the computer device to perform the operations in the foregoing blockchain message processing method.

BRIEF DESCRIPTION OF THE DRAWINGS

To describe the technical solutions in the embodiments of this application or in the related art more clearly, the following briefly describes the accompanying drawings required for describing the embodiments or the related art. Apparently, the accompanying drawings in the following description show only some embodiments of this application, and a person of ordinary skill in the art may derive other drawings from the accompanying drawings without creative efforts.

DESCRIPTION OF EMBODIMENTS

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The embodiments of this application may apply a data transmission technology in big data, and the data transmission technology belongs to the field of a cloud technology.

The cloud technology is a hosting technology that unifies a series of resources such as hardware, software, and networks in a wide area network or a local area network to implement computing, storage, processing, and sharing of data.

The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing.

The big data refers to a collection of data that cannot be captured, managed, and processed by conventional software tools within a certain time range. The big data is high-volume, high-velocity, and high-variety information assets that require new processing modes that enable enhanced decision-making, insight discovery, and process optimization. With the advent of the cloud era, the big data also attracts more attention, and the big data requires special technology to efficiently process a large amount of data that tolerates elapsed time. Technologies applicable to the big data include large-scale parallel processing databases, data mining, distributed file systems, distributed databases, cloud computing platforms, the Internet, and scalable storage systems. When there is a large amount of smart contract data that needs to be processed in this application, data interaction between an oracle contract node and an off-chain node may be implemented based on the data transmission technology in the big data.

Figure 1:
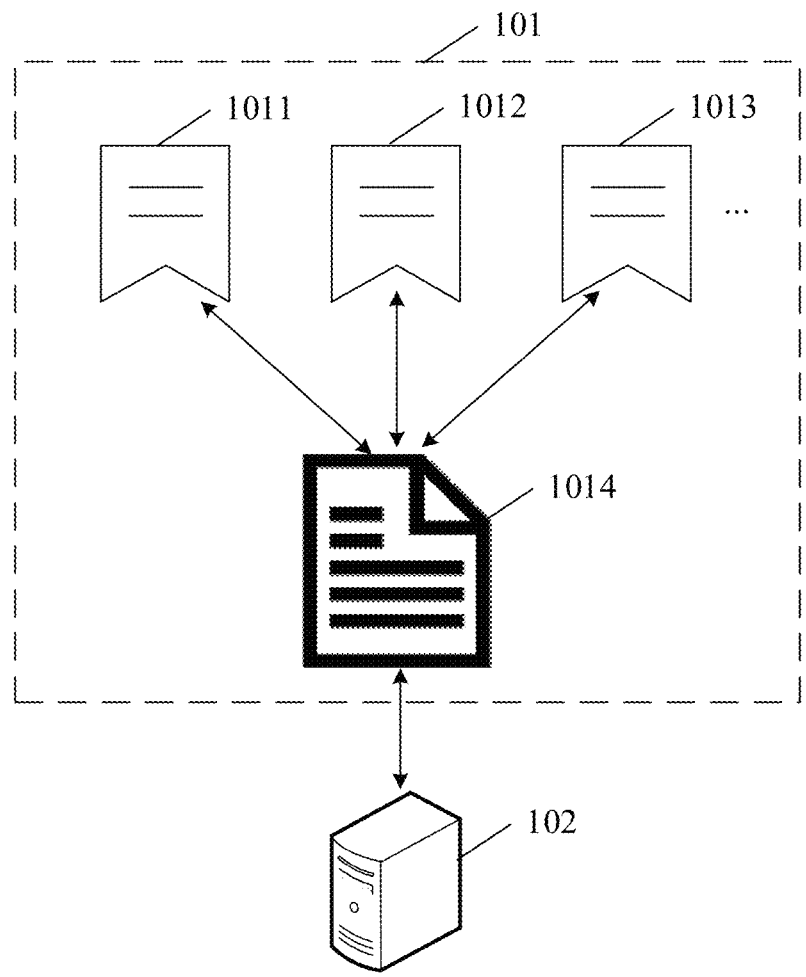
FIG. 1 is a schematic diagram of a blockchain message processing network according to an embodiment of this application.

FIG. 1 is a schematic diagram of a blockchain message processing network according to an embodiment of this application. As shown in FIG. 1, an oracle includes an oracle contract node and an off-chain node, the oracle contract node being configured to acquire data of a smart contract from a blockchain, and return data acquired from the off-chain node to the smart contract. The off-chain node calls an oracle contract in the oracle contract node to obtain service contract information, performs a service request event in the service contract information to obtain an event request result of the service request event, and feeds back the event request result to the oracle contract node. The oracle contract node feeds back the event request result to the smart contract.

For example, as shown in FIG. 1, a blockchain 101 includes at least one service smart contract, including a service smart contract 1011, a service smart contract 1012, a service smart contract 1013, and the like. Service contract information corresponding to each service smart contract is added to an oracle contract 1014, so as to manage at least one service smart contract through the oracle contract 1014, the oracle contract 1014 being stored in the oracle contract node. The oracle contract 1014 maintains a service contract information set. The service contract information set includes at least one piece of service contract information, and the service contract information set may be stored in a format such as a chart or a mapping relationship text. For example, reference may be made to Table 1 below:

TABLE 1

| Service contract information | | | |
|---|---|---|---|
| Contract identifier | Transaction hash | Service processing time | Service request object |
| Service smart contract 1011 | Transaction hash 1 | Service processing time 1 | Service request object 1 |
| | Transaction hash 2 | Service processing time 2 | Service request object 2 |
| Service smart contract 1012 | Transaction hash 3 | Service processing time 3 | Service request object 3 |
| Service smart contract 1013 | Transaction hash 4 | Service processing time 4 | Service request object 4 |
| ... | ... | ... | ... |

As shown in Table 1, the service contract information includes a contract identifier of a service smart contract and a service request event corresponding to the service smart contract. The service request event may include a service processing time, a service request object, or the like. A transaction hash is a hash value of a corresponding service processing event. The service request object is used for representing a data object requested after a corresponding service smart contract is triggered. For example, the service request object may be "a competition score between team A and team B".

Specifically, the oracle contract node manages the service contract information corresponding to the service smart contracts (including the service smart contract 1011, the service smart contract 1012, the service smart contract 1013, and the like) through the oracle contract 1014. One service smart contract may correspond to one or at least two pieces of service contract information. Taking the service smart contract 1011 as an example, the oracle contract node transmits the service contract information corresponding to the service smart contract 1011 to a target off-chain node 102. The target off-chain node 102 acquires the event request result based on the service request event in the service contract information, and transmits the event request result to the oracle contract node. The oracle contract node feeds back the acquired event request result to the service smart contract 1011 corresponding to the contract identifier.

The oracle contract node and the target off-chain node 102 constitute an oracle, and the oracle contract node and the service smart contracts are deployed in the blockchain 101.

Figure 2:
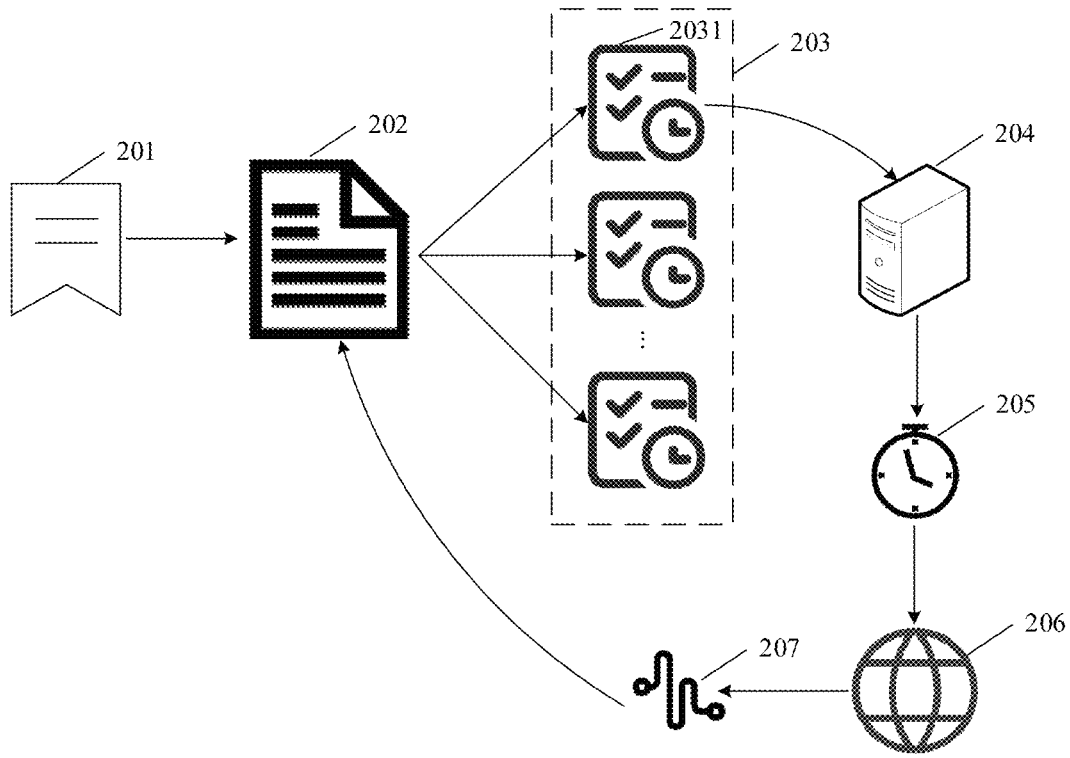
FIG. 2 is a schematic diagram of a blockchain message processing scenario according to an embodiment of this application.

Specifically, FIG. 2 is a schematic diagram of a blockchain message processing scenario according to an embodiment of this application. As shown in FIG. 2, service contract information 2031 corresponding to a service smart contract 201 is pushed to an oracle contract node, and the oracle contract node adds the service contract information 2031 to an oracle contract 202, to manage all acquired service contract information through the oracle contract 202. In some embodiments, the oracle contract 202 includes a service contract information set 203, and the oracle contract node adds the service contract information 2031 to the service contract information set 203. The service contract information 2031 includes a contract identifier of the service smart contract 201 and a service request event corresponding to the service smart contract 201. The oracle contract node transmits the service contract information 2031 to a target off-chain node 204. After acquiring the service contract information 2031, the target off-chain node 204 acquires a service processing time in the service contract information 2031. The service processing time belongs to a service processing event. The target off-chain node 204 creates a service timer 205 for the service contract information based on the service processing time.

When a value of the service timer 205 reaches the service processing time, a data acquisition address 206 corresponding to the service processing event is acquired, the data acquisition address 206 is accessed, an event request result 207 corresponding to the service processing event is acquired, and the event request result 207 is fed back to an oracle contract node 202. The oracle contract node 202 acquires a contract identifier corresponding to the event request result 207, and transmits the event request result 207 to a service smart contract 301 corresponding to the contract identifier, so as to encapsulate the event request result 207 into an event result block based on the service smart contract 301. The event result block is added to a blockchain after consensus is performed on the event result block.

In the embodiments of this application, the oracle contract is managed by the oracle contract node, so as to implement data interaction between the service smart contract in the blockchain and the target off-chain node outside the blockchain based on the oracle contract. Because the off-chain node may acquire the event request result in real time based on the acquired service contract information, and return the event request result to the oracle contract node, so that the oracle contract node may return the event request result to the smart contract in time, thereby improving real-time performance of data acquisition by the service smart contract, and further improving efficiency of blockchain message processing.

In the embodiments of this application, service contract information is acquired and added to an oracle contract. The service contract information includes a contract identifier of a service smart contract and a service request event corresponding to the service smart contract. A target off-chain node is acquired, and the service contract information is transmitted to the target off-chain node through the oracle contract, so that the target off-chain node acquires an event request result corresponding to the service request event. The event request result transmitted by the target off-chain node is acquired, and the event request result is fed back to the service smart contract corresponding to the contract identifier. In the embodiments of this application, the oracle contract is recorded in the oracle contract node, and the oracle contract node stores content of each smart contract that needs to acquire data from an off-chain node, that is, the service contract information corresponding to the smart contract. Data interaction is performed between the oracle contract node and the off-chain node. The off-chain node may trigger the step of acquiring the event request result in real time according to the acquired service contract information, and return the acquired event request result to the oracle contract node. The off-chain node automatically acquires and transmits the event request result, so that the off-chain node can acquire the event request result corresponding to the service contract information in time. Further, the oracle contract node can also acquire data from the off-chain node in time, and return the acquired data to a corresponding smart contract, thereby improving real-time performance of data interaction between on-chain and off-chain in the blockchain, and improving efficiency of blockchain message processing.

The oracle contract node may be a server or a terminal device, or a system formed by a server and a terminal device, and the terminal device may be an electronic device, including but not limited to a mobile phone, a tablet computer, a desktop computer, a notebook computer, a palmtop computer, a mobile internet device (MID), a wearable device (for example, a smart watch or a smart bracelet), and the like. The server may be an independent physical server, or may be a server cluster including a plurality of physical servers or a distributed system, or may be a cloud server providing a cloud computing service. The terminal device and the server may be directly or indirectly connected in a wired or wireless communication manner. This is not limited in this application.

The target off-chain node is a computer device, and the computer device may be a server or a terminal device.

Figure 3:
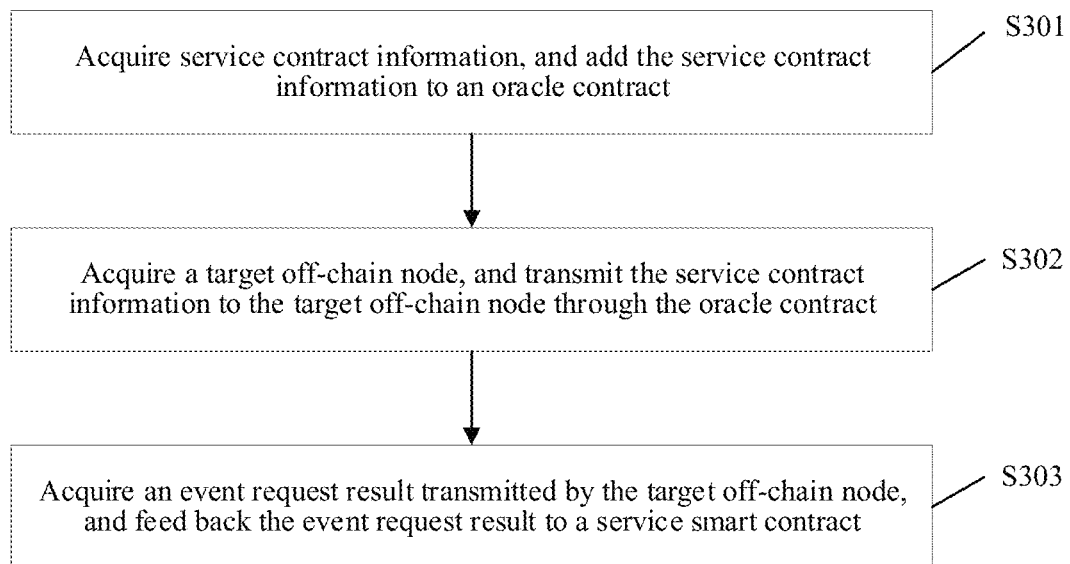
FIG. 3 is a flowchart of a blockchain message processing method according to an embodiment of this application.

Further, FIG. 3 is a flowchart of a blockchain message processing method according to an embodiment of this application. As shown in FIG. 3, the foregoing oracle contract node is used as an execution subject for description, and the oracle contract node stores an oracle contract. The blockchain message processing process includes the following steps:

Step S301. Acquire service contract information, and add the service contract information to the oracle contract.

Specifically, the oracle contract node acquires service contract information corresponding to a service smart contract, and adds the service contract information to the oracle contract. The service contract information includes a contract identifier of the service smart contract and a service request event corresponding to the service smart contract. The service request event may include a service processing time, a service request object, or the like. Each service request event may correspond to one piece of transaction data in the service smart contract. In some embodiments, because there may be a plurality of pieces of transaction data in one service smart contract, the oracle contract node may acquire a plurality of pieces of service contract information from the service smart contract, and add the plurality of pieces of acquired service contract information to the oracle contract. In the embodiments of this application, an example in which one service smart contract includes one piece of transaction data is used for description.

The oracle contract node monitors a block chaining status in the blockchain, and acquires a block chaining message of a contract block, the block chaining message including the service smart contract. The contract block refers to a transaction block used for adding the service smart contract to the blockchain. In other words, when the contract block is added to the blockchain, a message transmission process is triggered, and the block chaining message of the contract block is transmitted to the oracle contract node. After receiving the block chaining message, the oracle contract node acquires the service smart contract in the block chaining message. The oracle contract node acquires the contract identifier of the service smart contract, and parses the service smart contract, to obtain a service request event, the service request event being used for representing a data object requested after the service smart contract is triggered. The service contract information is generated according to the contract identifier and the service request event.

Figure 4:
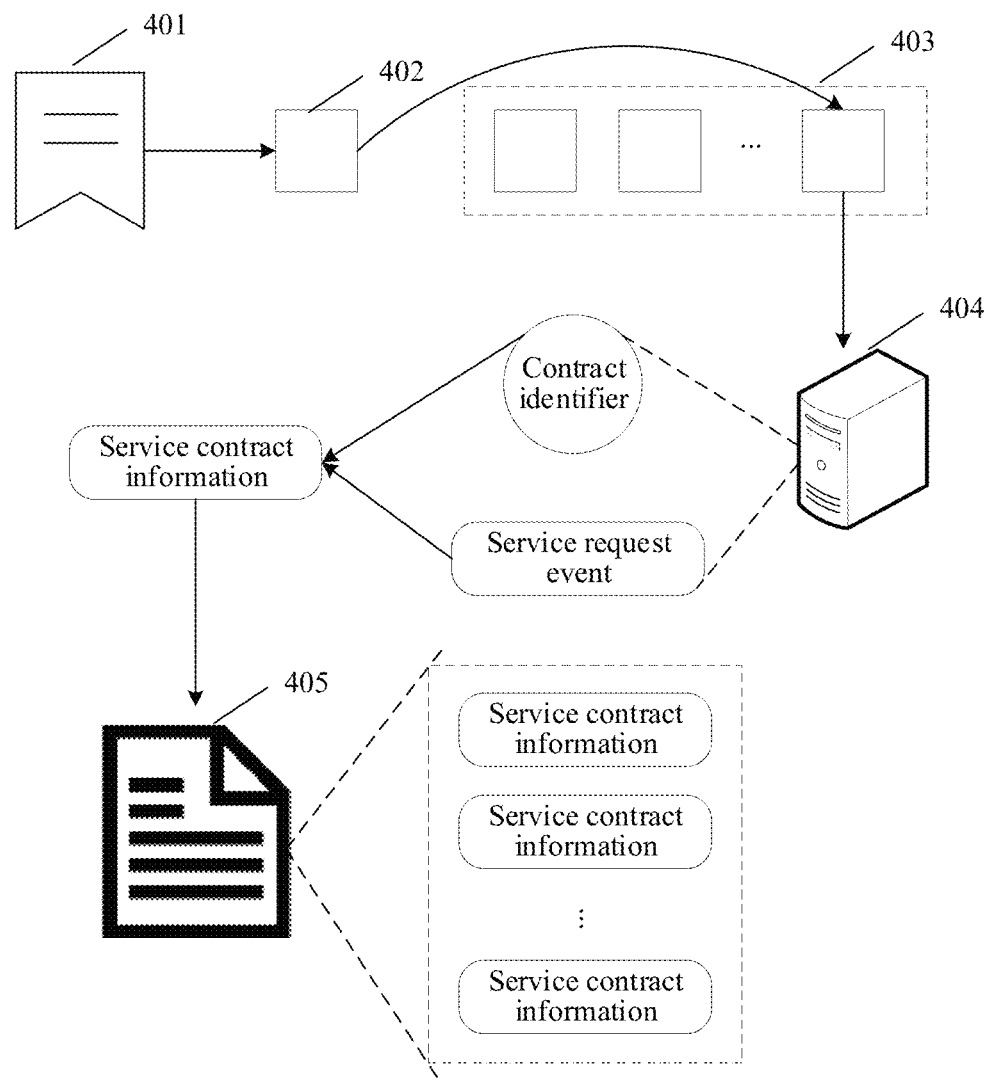
FIG. 4 is a schematic diagram of a service contract information processing scenario according to an embodiment of this application.

Specifically, FIG. 4 is a schematic diagram of a service contract information processing scenario according to an embodiment of this application. As shown in FIG. 4, a service contract node generates a contract block 402 according to a service smart contract 401, and broadcasts the contract block 402 to a consensus node, so that the consensus node performs consensus on the contract block 402. When consensus is reached on the contract block 402, the contract block 402 is added to a blockchain 403. When an oracle contract node 404 monitors a chaining operation of the contract block 402 corresponding to the service smart contract 401, the oracle contract node 404 acquires a block chaining message of the contract block, acquires a contract identifier of the service smart contract 401, and parses the service smart contract 402, to obtain a service request event. The oracle contract node 404 may acquire transaction data of the service smart contract 401, and obtain the service request event from the transaction data according to a service request parameter corresponding to the service request event. The oracle contract node 404 generates service contract information according to the contract identifier and the service request event, and adds the service contract information to an oracle contract 405. The oracle contract 405 includes zero or at least one piece of service contract information. Further, the service contract information included in the oracle contract 405 may be collectively referred to as a service contract information set. In some embodiments, the service contract information set may be stored in the oracle contract 405 in a format such as a chart or a mapping relationship text, as the formats shown in Table 1 above.

Step S302. Acquire a target off-chain node, and transmit the service contract information to the target off-chain node through the oracle contract.

Specifically, the oracle contract node acquires the target off-chain node, and transmits the service contract information to the target off-chain node through the oracle contract, so that the target off-chain node acquires an event request result corresponding to the service request event based on the service contract information.

In some embodiments, when the target off-chain node is acquired, an oracle may include a plurality of off-chain nodes, and the oracle contract node acquires off-chain nodes in an idle state from the plurality of off-chain nodes as candidate off-chain nodes. Network quality parameters of the candidate off-chain nodes are acquired, and the candidate off-chain node with the highest network quality parameter is determined as the target off-chain node. The network quality parameter includes but is not limited to a network bandwidth, a network delay, a network throughput, a network transmission rate, or the like. The network quality parameter may be formed of one or more parameters. For example, when the network quality parameter is the network bandwidth, an off-chain node with the largest network bandwidth is acquired from the plurality of off-chain nodes as the target off-chain node.

In some embodiments, when the target off-chain node is acquired, the oracle contract node may acquire a target service type to which the service request event belongs, and acquire an off-chain node corresponding to the target service type as the target off-chain node.

Step S303. Acquire the event request result transmitted by the target off-chain node, and return the event request result to the service smart contract.

Specifically, the oracle contract node acquires the event request result transmitted by the target off-chain node, and feeds back the event request result to the service smart contract based on the oracle contract. In some embodiments, the oracle contract node acquires the event request result transmitted by the target off-chain node, acquires a protocol data format of the service request event corresponding to the event request result, and converts a data format of the event request result into the protocol data format, to obtain a conversion execution result. The protocol data format refers to a data format that may be recognized by each network node in the blockchain, and the protocol data format may be obtained through negotiation between the oracle contract node and the service contract node. In some embodiments, the service smart contract may include the protocol data format. After acquiring the event request result, the oracle contract node acquires the service smart contract corresponding to the event request result, and acquires the protocol data format from the service smart contract. Alternatively, in a case of acquiring the service contract information, the oracle contract node may also acquire the protocol data format. The manner of acquiring the protocol data format is not repeated herein again.

In some embodiments, after acquiring the event request result, the oracle contract node generates a result feedback block according to the event request result, broadcasts the result feedback block to the consensus node for performing consensus, when consensus is reached on the result feedback block, converts the data format of the event request result, to obtain the conversion execution result, and feeds back the conversion execution result to the service smart contract. Alternatively, the oracle contract node may convert the data format of the event request result, to obtain the conversion execution result, generate a result feedback block according to the conversion execution result, broadcast the result feedback block to the consensus node for performing consensus, and when consensus is reached on the result feedback block, return the event request result to the service smart contract.

In the embodiments of this application, service contract information is acquired and added to an oracle contract through the foregoing blockchain message processing process. The service contract information includes a contract identifier of a service smart contract and a service request event corresponding to the service smart contract. A target off-chain node is acquired, and the service contract information is transmitted to the target off-chain node through the oracle contract, so that the target off-chain node acquires an event request result corresponding to the service request event. The event request result transmitted by the target off-chain node is acquired, and the event request result is fed back to the service smart contract corresponding to the contract identifier. According to this application, a network node in the blockchain and an off-chain node outside the blockchain are connected through the oracle contract node. Data management of the service smart contract in the blockchain, and data interaction with the off-chain node are implemented by the oracle contract node. The off-chain node can automatically trigger the process of acquiring the event request result corresponding to the service contract information, and transmit the event request result to the oracle contract node, thereby improving real-time performance of data interaction between on-chain and off-chain in the blockchain, and further improving efficiency of blockchain message processing.

Figure 5:
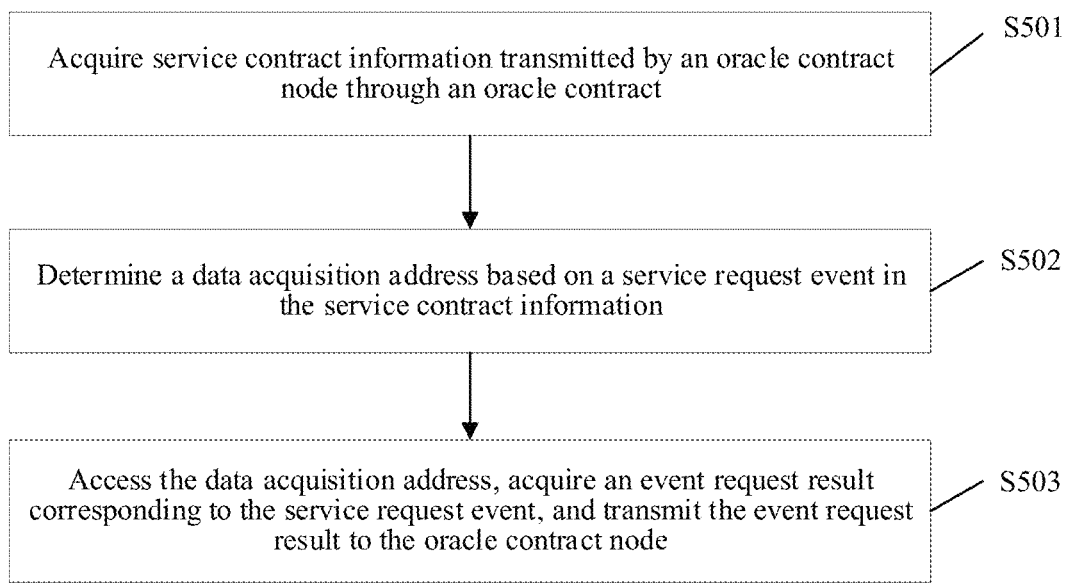
FIG. 5 is another schematic flowchart of blockchain message processing according to an embodiment of this application.

Further, FIG. 5 is another schematic flowchart of blockchain message processing according to an embodiment of this application. As shown in FIG. 5, with a target off-chain node as an execution subject, the blockchain message processing method includes the following steps:

Step S501. Acquire service contract information transmitted by an oracle contract node through an oracle contract.

Specifically, the target off-chain node acquires the service contract information transmitted by the oracle contract node through the oracle contract, the service contract information including a contract identifier of a service smart contract and a service request event corresponding to the service smart contract. The target off-chain node may acquire data required by the corresponding service smart contract according to the service request event, and the data may be recorded as an event request result.

Step S502. Determine a data acquisition address based on the service request event in the service contract information.

Specifically, the target off-chain node determines the data acquisition address based on the service request event. The service request event may include a service request object, the service request object being used for representing a data object requested after the service smart contract is triggered, and the target off-chain node may determine the data acquisition address based on the service request object.

Step S503. Access the data acquisition address, acquire an event request result corresponding to the service request event, and transmit the event request result to the oracle contract node.

Specifically, the target off-chain node accesses the data acquisition address, acquires content data corresponding to the data acquisition address, and acquires data associated with the service request event from the content data as the event request result corresponding to the service request event. The event request result is transmitted to the oracle contract node, so that the oracle contract node may return the event request result to the service smart contract corresponding to the contract identifier.

In the embodiments of this application, the target off-chain node acquires the service request event in the service contract information based on the service contract information transmitted by the oracle contract node, acquires the event request result from the Internet according to the service request event, and transmits the event request result to the oracle contract node, so that the oracle contract node may return the event request result to the corresponding service smart contract. In the embodiments of this application, the target off-chain node acquires data from outside of the blockchain. The service smart contract in the blockchain and the off-chain node outside the blockchain are connected through the oracle contract node, and data interaction between the service smart contract and the off-chain node is implemented, making data interaction between on-chain and off-chain in the blockchain more convenient and faster. In addition, the off-chain node automatically triggers the process of acquiring the event request result through the service contract information, so that the off-chain node may acquire the event request result in real time, and return the event request result to the oracle contract node in time, thereby improving real-time performance of data interaction between on-chain and off-chain in the blockchain, and further improving efficiency of blockchain message processing.

Figure 6:
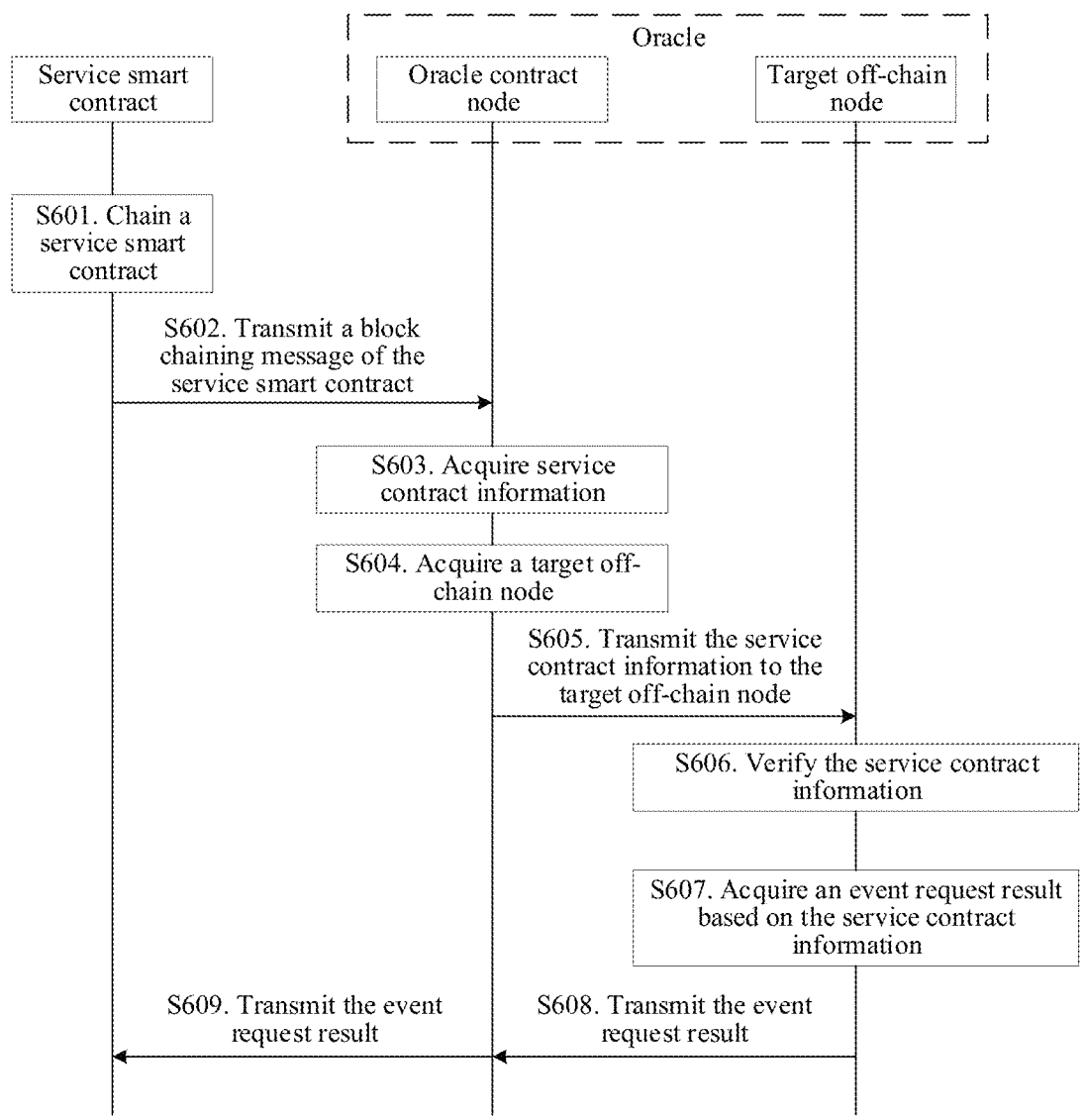
FIG. 6 is an interactive flowchart of blockchain message processing according to an embodiment of this application.

Further, FIG. 6 is an interactive flowchart of blockchain message processing according to an embodiment of this application. As shown in FIG. 6, the blockchain message processing interactive process includes the following steps:

Step S601. Chain a service smart contract.

Specifically, a service contract node generates a contract block according to the service smart contract, and broadcasts the contract block to each consensus node in a blockchain to perform consensus, and when consensus is reached on the contract block, adds the contract block to the blockchain, and triggers step S602.

Step S602. The service contract node transmits a block chaining message of the service smart contract to an oracle contract node.

Specifically, the service contract node transmits the block chaining message of the service smart contract to the oracle contract node. In some embodiments, the oracle contract node may monitor a chaining status of the contract block, and acquire the block chaining message in a case of monitoring that the contract block is chained.

Step S603. The oracle contract node acquires service contract information.

Specifically, the oracle contract node acquires the service contract information, and adds the service contract information to the oracle contract. For this process, reference may be made to the specific description shown in step S301 in FIG. 3. The service request event may include a service request object, a service processing time, or the like. Further, the oracle contract node may generate a hash value of the service request event as a transaction hash, and generate the service contract information according to a contract identifier, the transaction hash, and the service request event. In some embodiments, the service smart contract may include a plurality of pieces of transaction data. The oracle contract node acquires data in the service smart contract, to obtain the plurality of pieces of transaction data, and acquires the service contract information according to the transaction data. For example, the service smart contract includes N pieces of transaction data, the oracle contract node acquires the N pieces of service contract information according to the service smart contract, and the transaction data is in one-to-one correspondence to the service contract information, N being a positive integer.

In some embodiments, the oracle contract includes a service mapping table, the service mapping table including a service type and a service data set corresponding to the service type. After acquiring the service contract information, the oracle contract node acquires a target service type to which the service request event in the service contract information belongs, acquires a target service data set corresponding to the target service type from the oracle contract, and adds the service contract information to the target service data set.

Figure 7:
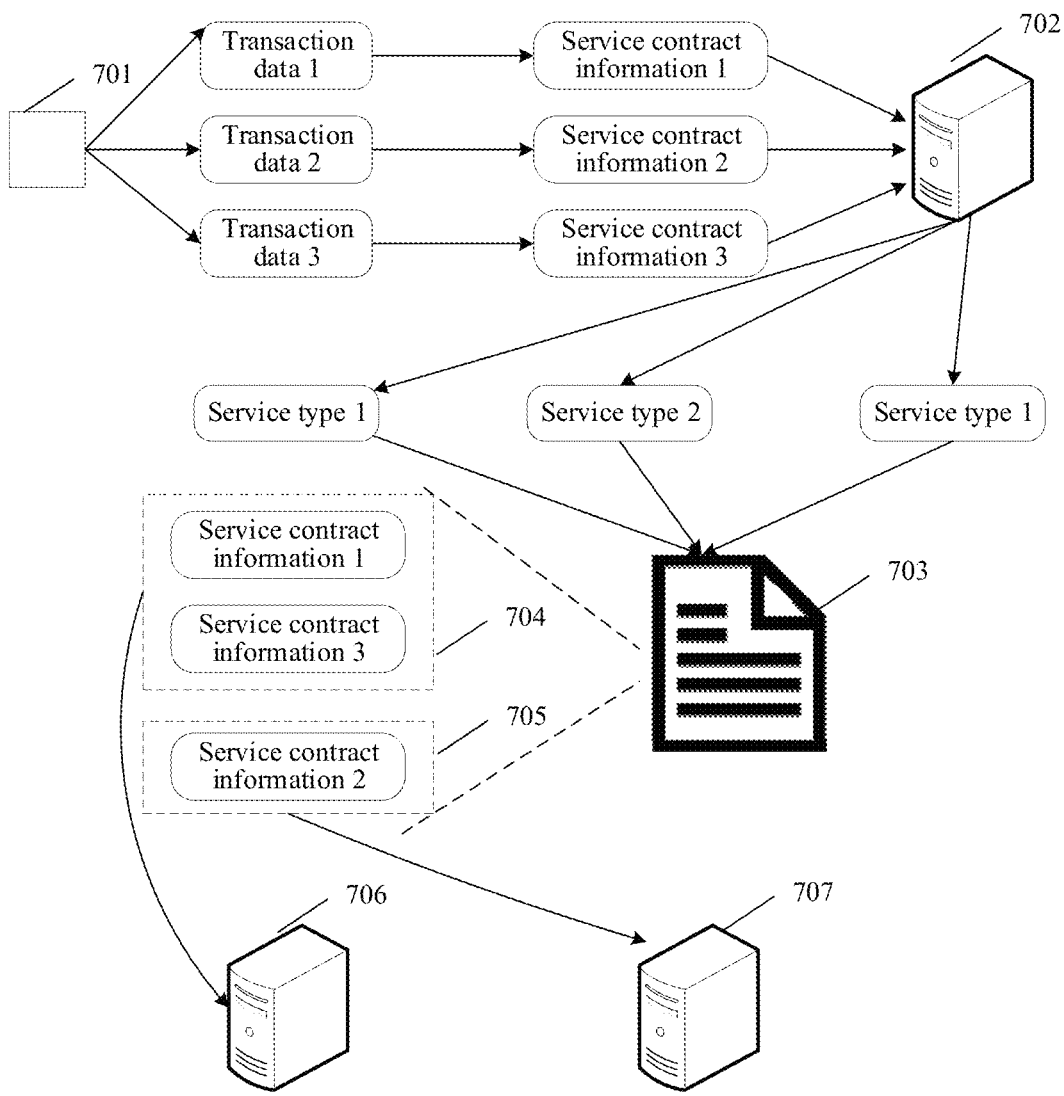
FIG. 7 is a schematic diagram of a service contract information storing scenario according to an embodiment of this application.

For example, FIG. 7 is a schematic diagram of a service contract information storing scenario according to an embodiment of this application. As shown in FIG. 7, an oracle contract node 702 acquires transaction data in a contract block 701, including transaction data 1, transaction data 2, and transaction data 3. Service contract information 1 is generated according to the transaction data 1, service contract information 2 is generated according to the transaction data 2, and service contract information 3 is generated according to the transaction data 3. The oracle contract node 702 acquires a service type corresponding to a service request event in the service contract information 1 as a service type 1, acquires a service type corresponding to a service request event in the service contract information 2 as a service type 2, and acquires a service type corresponding to a service request event in the service contract information 3 as a service type 1. The oracle contract node 702 adds all the service contract information to an oracle contract 703. Specifically, the service contract information 1 and the service contract information 3 are added to a service data set 704 corresponding to the service type 1, and the service contract information 2 is added to a service data set 705 corresponding to the service type 2.

Step S604. The oracle contract node acquires the target off-chain node.

Specifically, the oracle contract node acquires the target off-chain node. In some embodiments, when there are a plurality of off-chain nodes, the oracle contract node acquires the target off-chain node from the plurality of off-chain nodes. For details, reference may be made to the specific description shown in step S302 in FIG. 3. Further, when the oracle contract includes the service mapping table, there is the service type and the service data set corresponding to the service type. The oracle contract node adds the service contract information to the target service data set, and acquires the off-chain node corresponding to the target service data set as the target off-chain node. All the service contract information included in the service mapping table in the oracle contract may be collectively referred to as a service contract information set, and service contract information corresponding to each service type in the service mapping table may be collectively referred to as the service data set corresponding to the service type. The service contract information set and the service data set may be regarded as a name used for describing service contract information in different statuses, and may not represent an entity.

Using FIG. 7 as an example, the oracle contract node 702 may acquire a target off-chain node 706 corresponding to the service data set 704, and acquire a target off-chain node 707 corresponding to the service data set 705.

The service mapping table may be shown in Table 2 below:

TABLE 2

| Service type | Service contract information |
|---|---|
| Service type 1 | Service data set 1 |
| Service type 2 | Service data set 2 |
| ... | ... |

A service data set corresponding to service types in the foregoing Table 2 is formed by one or more pieces of service contract information, or the service data set may be empty.

Step S605. The oracle contract node transmits the service contract information to the target off-chain node.

Specifically, the oracle contract node transmits the service contract information to the target off-chain node. For details, reference may be made to the specific description shown in step S302 in FIG. 3. In some embodiments, when the service contract information includes the transaction hash corresponding to the service request event, the oracle contract node may directly transmit the transaction hash and the service request event to the target off-chain node through the oracle contract. As shown in FIG. 7, the oracle contract node 702 transmits the service contract information 1 and the service contract information 3 to the target off-chain node 706 through the oracle contract 703, and transmits the service contract information 2 to the target off-chain node 707.

In some embodiments, the oracle contract node may generate a service contract block according to the service contract information, and broadcast the service contract block to each consensus node for performing consensus. When consensus is reached, the service contract information is transmitted to the target off-chain node. When consensus is not reached, the service contract information is regenerated according to the service smart contract, consensus is performed on the service contract information until consensus is reached, and the service contract information is transmitted to the target off-chain node. In some embodiments, when the number of consensus failures of the oracle contract node is greater than or equal to a consensus exception threshold, the oracle contract node in the oracle may be recreated.

Step S606. The target off-chain node verifies the service contract information.

Specifically, when the service contract information includes the transaction hash, the target off-chain node generates a verification hash of the service request event, and compares the verification hash with the transaction hash. When the transaction hash is the same as the verification hash, step S607 is triggered. When the transaction hash is different from the verification hash, a service data exception message is transmitted to the oracle contract node. In some embodiments, the target off-chain node may acquire the service request event in the service contract information, and detect abnormality an abnormal status of the service request event. Specifically, the target off-chain node may detect an abnormal status of the service processing time and the service request object of the service request event. For example, whether data associated with the service request object may be acquired within the service processing time is detected. When the service request event is abnormal, the service data exception message is transmitted to the oracle contract node. When the service request event is normal, step S607 is triggered. For example, if the service processing time is 15:00 on Jun. 2, 2020, the service request object is a competition result of a first competition participant and a second competition participant in a first competition. The target off-chain node detects whether there is a competition between the first competition participant and the second competition participant in the first competition at 15:00 on Jun. 2, 2020. If there is a competition, the service request event is determined to be normal. If there is no competition, the service request event is determined to be abnormal.

Step S607. The target off-chain node acquires an event request result based on the service contract information.

Specifically, the service contract information includes service contract information processed in real time and service contract information delayed for processing, the service contract information delayed for processing including the service processing time. When the service contract information is the service contract information processed in real time, the target off-chain node determines a data acquisition address based on the service request event in the service contract information. Specifically, the target off-chain node determines a data acquisition address based on the service request object in the service request event, and accesses the data acquisition address.

When the service contract information is the service contract information delayed for processing, the target off-chain node creates a service timer corresponding to the service contract information based on the service processing time. When a value of the service timer is the same as the service processing time, the target off-chain node determines a data acquisition address based on the service request event in the service contract information, and accesses the data acquisition address. In some embodiments, when the service contract information is the service contract information delayed for processing, after determining the data acquisition address, the target off-chain node may create a service timer based on the service processing time. When a value of the service timer is the same as the service processing time, the target off-chain node accesses the data acquisition address.

The target off-chain node accesses the data acquisition address, and acquires the event request result corresponding to the service request event. For the process of determining the data acquisition address, reference may be made to step S502 in FIG. 5, and for the process of accessing the data acquisition address and acquiring the event request result corresponding to the service request event, reference may be made to step S503 in FIG. 5. For example, if the service processing time is 15:00 on Jun. 2, 2020, the service request object is a competition result of a first competition participant and a second competition participant in a first competition. The target off-chain node acquires a data acquisition address based on the service request object, and the data acquisition address may be an official website address of the first competition, a statistics website of the competition result of the first competition, or the like. That is, the data acquisition address is a website in which data associated with the service request object may be acquired. The target off-chain node accesses the data acquisition address, and acquires the data associated with the service request object as the event request result.

Step S608. The target off-chain node transmits the event request result to the oracle contract node.

Specifically, the service contract information may include the transaction hash. The target off-chain node acquires the transaction hash, and encapsulates the transaction hash and the event request result into a service response message, the transaction hash being used for representing a basis for the oracle contract node to acquire the contract identifier. Alternatively, in a case the service contract information includes the contract identifier, the target off-chain node acquires the contract identifier, and encapsulates the contract identifier and the event request result into a service response message. The target off-chain node transmits the service response message to the oracle contract node.

The oracle contract node receives the service response message transmitted by the target off-chain node, and acquires the event request result in the service response message. The service response message includes the event request result and the transaction hash, or the service response message includes the event request result and the contract identifier.

Step S609. The oracle contract node transmits the event request result to the service contract node.

Specifically, when the service response message includes the event request result and the transaction hash, the oracle contract node acquires the transaction hash in the service response message, and determines the contract identifier corresponding to the event request result based on the transaction hash. There is an association relationship between the contract identifier and the transaction hash, and the association relationship may be stored in the service mapping table. The event request result is fed back to the service smart contract corresponding to the contract identifier, so that the service smart contract may perform subsequent operations based on the event request result.

Alternatively, when the service response message includes the event request result and the contract identifier, the target off-chain node acquires the contract identifier in the service response message, and feeds back the event request result to the service smart contract corresponding to the contract identifier, so that the service smart contract may perform subsequent operations based on the event request result.

For example, if the service smart contract allocates an amount of statistical data based on the competition result of the first competition participant and the second competition participant in the first competition, the service contract node acquires the event request result, starts the service smart contract, and allocates the amount of the statistical data according to the event request result and an allocation rule in the service smart contract.

The service smart contract and the oracle contract node may be implemented through an Ethereum smart contract virtual machine (EVM).

In the embodiments of this application, service contract information is acquired and added to an oracle contract through the foregoing blockchain message processing process. The service contract information includes a contract identifier of a service smart contract and a service request event corresponding to the service smart contract. A target off-chain node is acquired, and the service contract information is transmitted to the target off-chain node through the oracle contract, so that the target off-chain node acquires an event request result corresponding to the service request event. The event request result transmitted by the target off-chain node is acquired, and the event request result is fed back to the service smart contract corresponding to the contract identifier. According to this application, a network node in the blockchain and an off-chain node outside the blockchain are connected through the oracle contract node. Data management of the service smart contract in the blockchain, and data interaction with the off-chain node are implemented by the oracle contract node. Therefore, data interaction between on-chain and off-chain in the blockchain may be implemented. In addition, the off-chain node automatically triggers the process of acquiring the event request result through the service contract information, so that the off-chain node may acquire the event request result in real time, and return the event request result to the oracle contract node in time, thereby improving real-time performance of data interaction between on-chain and off-chain in the blockchain, and further improving efficiency of blockchain message processing. At the same time, the oracle contract node may perform consensus verification on interactive data among the nodes, so as to ensure security and reliability of data outside the blockchain obtained by the blockchain.

Figure 8:
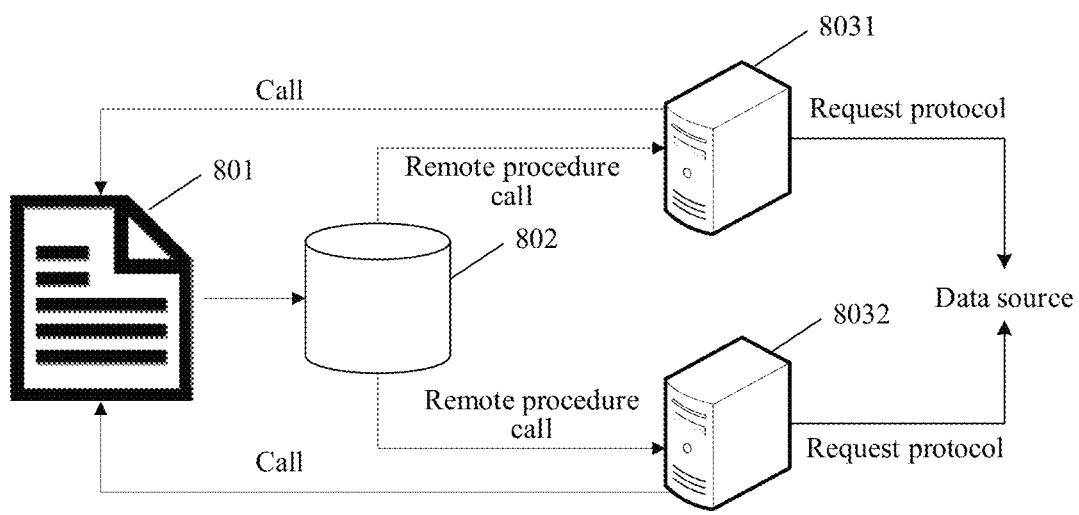
FIG. 8 is a schematic structural diagram of an oracle according to an embodiment of this application.

Further, FIG. 8 is a schematic structural diagram of an oracle according to an embodiment of this application. As shown in FIG. 8, the oracle includes an oracle contract node and an off-chain node. The oracle contract node stores an oracle contract 801. There may be one or at least two off-chain nodes, such as an off-chain node 8031 and an off-chain node 8032. The oracle contract 801 may store a service mapping table through a database 802. The off-chain node 8031 and the off-chain node 8032 call the oracle contract 801 in the oracle contract node, and acquire the service mapping table in the database 802 through a remote procedure call. When service contract information acquired by the off-chain node 8031 or the off-chain node 8032 includes a service processing time, a service timer is created for the acquired service contract information. When a value of the service timer reaches the service processing time, an event request result corresponding to the service contract information is acquired by calling a data source through a request protocol (that is, a data acquisition address is accessed through the request protocol, and data indicated by the data acquisition address may be referred to as the data source), where the request protocol may be a HyperText Transfer Protocol (http). After acquiring the event request result, the off-chain node 8031 or the off-chain node 8032 feeds back the event request result to the oracle contract 801 in the oracle contract node.

Figure 9:
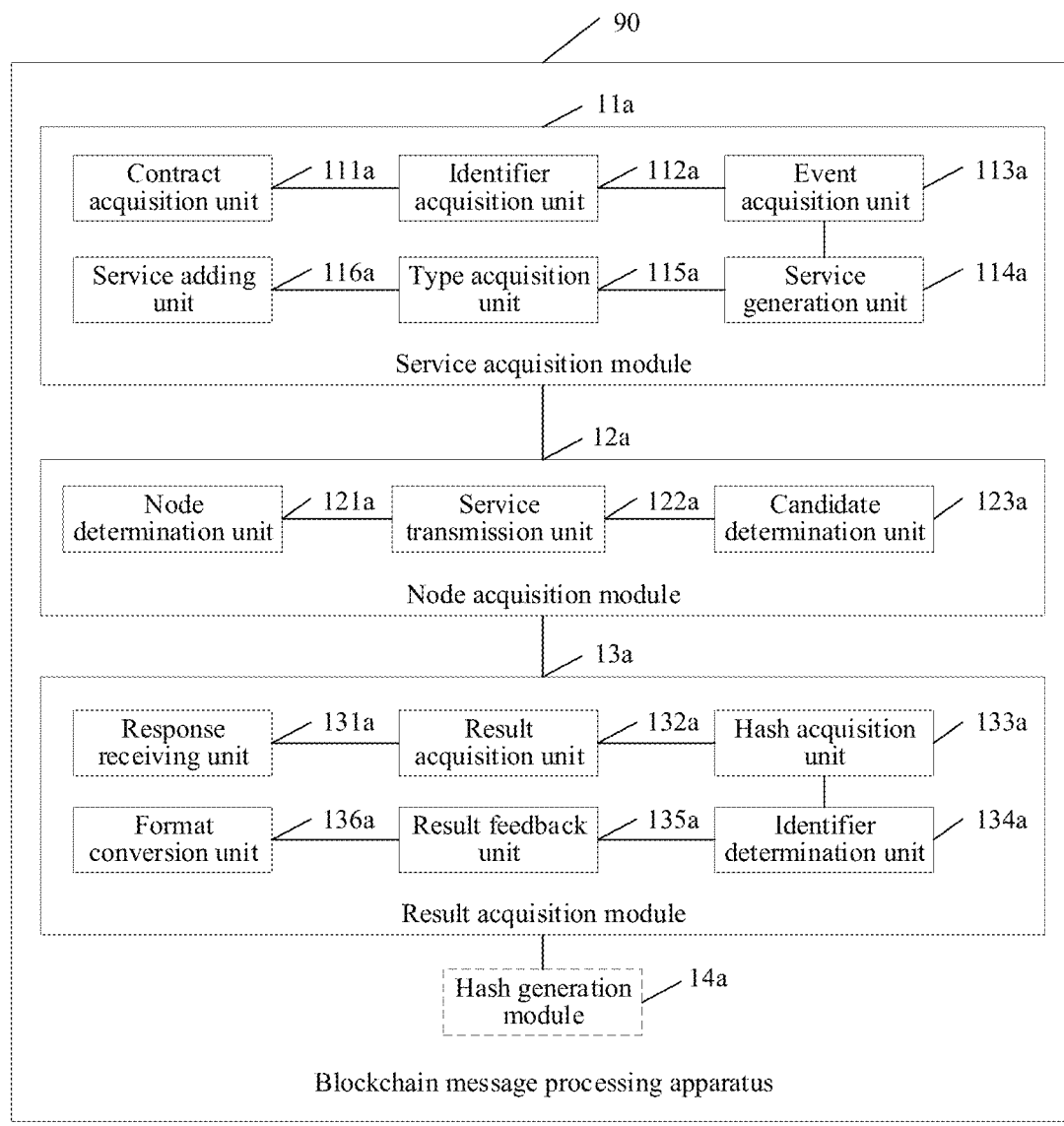
FIG. 9 is a schematic diagram of a blockchain message processing apparatus according to an embodiment of this application.

Further, FIG. 9 is a schematic diagram of a blockchain message processing apparatus according to an embodiment of this application. The blockchain message processing apparatus may be a computer-readable instruction (including a program code) running in a computer device. For example, the blockchain message processing apparatus is application software. The apparatus may be configured to perform corresponding steps in the method provided in the embodiments of this application. As shown in FIG. 9, the blockchain message processing apparatus 90 is applicable to the computer device in the foregoing corresponding embodiment in FIG. 3, FIG. 5, or FIG. 6. Specifically, the blockchain message processing apparatus 90 may include: a service acquisition module 11*a*, a node acquisition module 12*a*, and a result acquisition module 13*a*.

The service acquisition module 11*a* is configured to acquire service contract information, and add the service contract information to an oracle contract. The service contract information includes a contract identifier of a service smart contract and a service request event corresponding to the service smart contract.

The node acquisition module 12*a* is configured to acquire a target off-chain node, and transmit the service contract information to the target off-chain node through the oracle contract, so that the target off-chain node acquires an event request result corresponding to the service request event.

The result acquisition module 13*a* is configured to acquire the event request result transmitted by the target off-chain node, and return the event request result to the service smart contract corresponding to the contract identifier.

In terms of acquiring service contract information, the service acquisition module 11*a* includes:
a contract acquisition unit 111*a*, configured to acquire a block chaining message of a contract block, the block chaining message including the service smart contract;
an identifier acquisition unit 112*a*, configured to acquire the contract identifier of the service smart contract;
an event acquisition unit 113*a*, configured to parse the service smart contract, to obtain the service request event, the service request event being used for representing a requested data object after the service smart contract is triggered; and
a service generation unit 114*a*, configured to generate the service contract information according to the contract identifier and the service request event.

The apparatus 90 further includes:
a hash generation module 14*a*, configured to generate a hash value of the service request event as a transaction hash.

The service generation unit 114*a* is specifically configured to:
generate the service contract information according to the contract identifier, the transaction hash, and the service request event.

In terms of acquiring the event request result transmitted by the target off-chain node, the result acquisition module 13*a* includes:
a response receiving unit 131*a*, configured to receive a service response message transmitted by the target off-chain node, the service response message including the event request result and the transaction hash; and
a result acquisition unit 132*a*, configured to acquire the event request result in the service response message.

In terms of returning the event request result to the service smart contract corresponding to the contract identifier, the result acquisition module 13*a* includes:
a hash acquisition unit 133*a*, configured to acquire the transaction hash in the service response message;
an identifier determination unit 134*a*, configured to determine the contract identifier corresponding to the event request result based on the transaction hash, there being an association relationship between the contract identifier and the transaction hash; and
a result feedback unit 135*a*, configured to return the event request result to the service smart contract corresponding to the contract identifier.

The oracle contract includes a service mapping table, the service mapping table including a service type and a service data set corresponding to the service type.

In terms of adding the service contract information to the oracle contract, the service acquisition module 11*a* includes:
a type acquisition unit 115*a*, configured to acquire a target service type to which the service request event belongs, and acquire a target service data set corresponding to the target service type from the oracle contract; and
a service adding unit 116*a*, configured to add the service contract information to the target service data set.

The node acquisition module 12*a* includes:
a node determination unit 121*a*, configured to acquire an off-chain node corresponding to the target service data set as the target off-chain node; and
a service transmission unit 122*a*, configured to transmit the service contract information to the target off-chain node through the oracle contract.

In terms of acquiring the target off-chain node, the node acquisition module 12*a* further includes:

a candidate determination unit 123a, configured to acquire off-chain nodes in an idle state as candidate off-chain nodes.

The node determination unit 121a is further configured to acquire network quality parameters of the candidate off-chain nodes, and determine a candidate off-chain node with the highest network quality parameter as the target off-chain node.

In terms of returning the event request result to the service smart contract corresponding to the contract identifier, the result acquisition module 13a includes:

a format conversion unit 136a, configured to acquire a protocol data format corresponding to the service request event, and convert a data format of the event request result into the protocol data format, to obtain a conversion execution result.

The result feedback unit 135a is further configured to return the conversion execution result to the service smart contract corresponding to the contract identifier.

The blockchain message processing apparatus is described in the embodiments of this application. The apparatus acquires a service contract information and adds the service contract information to an oracle contract, the service contract information including a contract identifier of a service smart contract and a service request event corresponding to the service smart contract; acquires a target off-chain node, and transmits the service contract information to the target off-chain node through the oracle contract, so that the target off-chain node acquires an event request result corresponding to the service request event; and acquires the event request result transmitted by the target off-chain node, and feeds back the event request result to the service smart contract corresponding to the contract identifier. According to this application, a network node in the blockchain and an off-chain node outside the blockchain are connected through the oracle contract node. Data management of the service smart contract in the blockchain, and data interaction with the off-chain node are implemented by the oracle contract node. Therefore, data interaction between on-chain and off-chain in the blockchain may be implemented. In addition, the off-chain node automatically triggers the process of acquiring the event request result through the service contract information, so that the off-chain node may acquire the event request result in real time, and return the event request result to the oracle contract node in time, thereby improving real-time performance of data interaction between on-chain and off-chain in the blockchain, and further improving efficiency of blockchain message processing.

Figure 10:
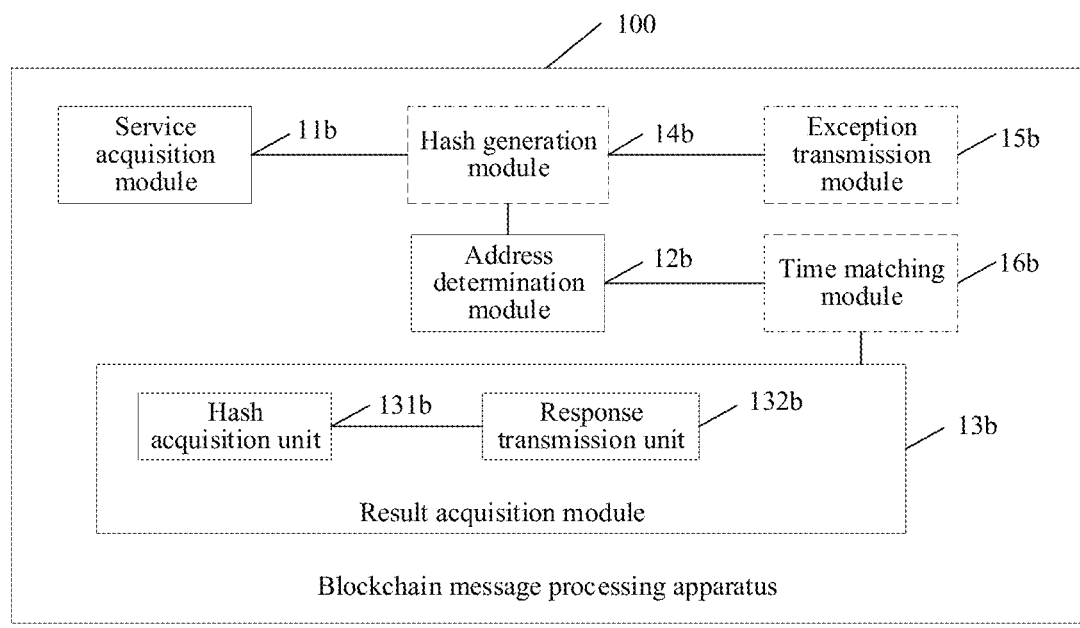
FIG. 10 is a schematic diagram of another blockchain message processing apparatus according to an embodiment of this application.

Further, FIG. 10 is a schematic diagram of another blockchain message processing apparatus according to an embodiment of this application. The blockchain message processing apparatus may be a computer-readable instruction (including a program code) running in a computer device. For example, the blockchain message processing apparatus is application software. The apparatus may be configured to perform corresponding steps in the method provided in the embodiments of this application. As shown in FIG. 10, the blockchain message processing apparatus 100 is applicable to the computer device in the foregoing corresponding embodiment in FIG. 3, FIG. 5, or FIG. 6. The blockchain message processing apparatus 100 may include: a service acquisition module 11b, an address determination module 12b, and a result acquisition module 13b.

The service acquisition module 11b is configured to acquire service contract information transmitted by an oracle contract node through an oracle contract. The service contract information includes a contract identifier of a service smart contract and a service request event corresponding to the service smart contract.

The address determination module 12b is configured to determine a data acquisition address based on the service request event.

The result acquisition module 13b is configured to access the data acquisition address, acquire an event request result corresponding to the service request event, and transmit the event request result to the oracle contract node, so that the oracle contract node feeds back the event request result to the service smart contract corresponding to the contract identifier.

The service contract information further includes a transaction hash.

The apparatus 100 further includes:

a hash generation module 14b, configured to generate a verification hash of the service request event, and trigger the process of determining a data acquisition address based on the service request event when the transaction hash is the same as the verification hash; and an exception transmission module 15b, configured to transmit a service data exception message to the oracle contract node when the transaction hash is different from the verification hash.

The service request event includes a service processing time.

The apparatus 100 further includes:

a time matching module 16b, configured to create a service timer based on the service processing time, and trigger the process of accessing the data acquisition address when a value of the service timer is the same as the service processing time.

In terms of transmitting the event request result to the oracle contract node, the result acquisition module 13b includes:

a hash acquisition unit 131b, configured to acquire the transaction hash, and encapsulate the transaction hash and the event request result into a service response message, the transaction hash being used for representing a basis for the oracle contract node to acquire the contract identifier; and a response transmission unit 132b, configured to transmit the service response message to the oracle contract node.

The blockchain message processing apparatus is described in the embodiments of this application. The apparatus acquires service contract information transmitted by an oracle contract node through an oracle contract, the service contract information including a contract identifier of a service smart contract and a service request event corresponding to the service smart contract; determines a data acquisition address based on the service request event. accesses the data acquisition address, acquires an event request result corresponding to the service request event, and transmits the event request result to the oracle contract node, so that the oracle contract node feeds back the event request result to the service smart contract corresponding to the contract identifier. In the embodiment of this application, the target off-chain node acquires data from outside the blockchain. The service smart contract in the blockchain and the off-chain node outside the blockchain are connected through the oracle contract node, and data interaction between the service smart contract and the off-chain node is implemented, making data interaction between on-chain and off-chain in the blockchain more convenient and faster. In addition, the off-chain node automatically triggers the process of acquiring the event request result through the service contract information, so that the off-chain node may acquire the event request result in real time, and return the event request result to the oracle contract node in time, thereby improving real-time performance of data interaction between on-chain and off-chain in the blockchain, and further improving efficiency of blockchain message processing.

Figure 11:
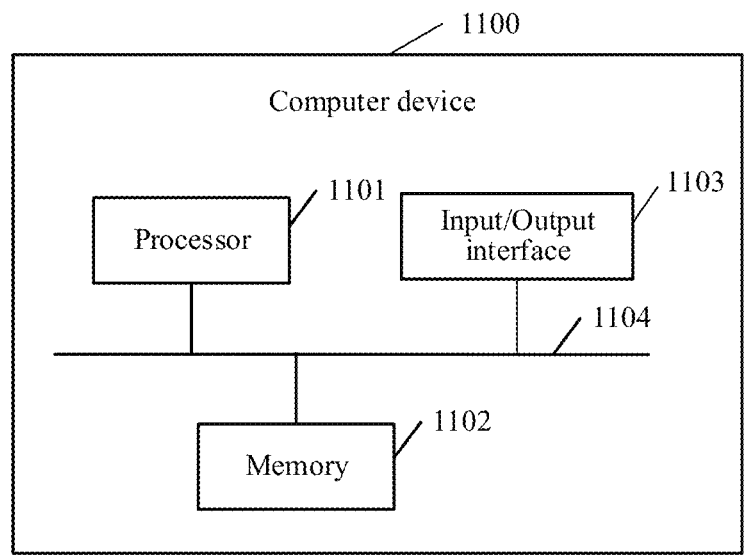
FIG. 11 is a schematic structural diagram of a computer device according to an embodiment of this application.

FIG. 11 is a schematic structural diagram of a computer device according to an embodiment of this application. As shown in FIG. 11, the computer device 1100 in this embodiment of this application may include: one or more processors 1101, a memory 1102, and an input/output interface 1103. The processor 1101, the memory 1102, the input/output interface 1103 are connected through a bus 1104. The memory 1102 is configured to store a computer-readable instruction, the computer-readable instruction including a program instruction. The input/output interface 1103 is applied to data interaction between each service smart contract in a consensus network and an oracle contract node, and between the oracle contract node and each off-chain node. The processor 1101 is configured to execute the program instruction stored in the memory 1102, and perform the following operations:

acquiring service contract information, and adding the service contract information to an oracle contract, the service contract information including a contract identifier of a service smart contract and a service request event corresponding to the service smart contract;

acquiring a target off-chain node, and transmitting the service contract information to the target off-chain node through the oracle contract, so that the target off-chain node acquires an event request result corresponding to the service request event; and acquiring the event request result transmitted by the target off-chain node, and returning the event request result to the service smart contract corresponding to the contract identifier.

Alternatively, the processor 1101 is configured to perform the following operations:

acquiring service contract information transmitted by an oracle contract node through an oracle contract, the service contract information including a contract identifier of a service smart contract and a service request event corresponding to the service smart contract;

determining a data acquisition address based on the service request event; and accessing the data acquisition address, acquiring an event request result corresponding to the service request event, and transmitting the event request result to the oracle contract node, so that the oracle contract node feeds back the event request result to the service smart contract corresponding to the contract identifier.

In some feasible implementations, the processor 1101 may be a central processing unit (CPU). The processor may further be another general-purpose processor, a digital signal processor (DSP), an application specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any conventional processor or the like.

The memory 1102 may include a read-only memory and a random access memory, and provide an instruction and data to the processor 1101 and the input/output interface 1103. A part of the memory 1102 may further include a non-volatile random access memory. For example, the memory 1102 may further store information of a device type.

In specific implementation, the foregoing computer may perform the implementations provided in the steps in FIG. 3, FIG. 5, or FIG. 6 through built-in functional modules of the computer. For details, reference may be made to the implementations provided in the steps in FIG. 3, FIG. 5, or FIG. 6, and details are not described herein again.

An embodiment of this application provides a computer device, including: a processor, an input/output interface, and a memory. The processor acquires a computer instruction in the memory, to perform the steps of the method shown in FIG. 3, FIG. 5, or FIG. 6, and perform blockchain message processing operations. The processor performs the following operations through the computer instruction in the memory: acquiring service contract information, and adding the service contract information to an oracle contract, the service contract information including a contract identifier of a service smart contract and a service request event corresponding to the service smart contract; acquiring a target off-chain node, and transmitting the service contract information to the target off-chain node through the oracle contract, so that the target off-chain node acquires an event request result corresponding to the service request event; and acquiring the event request result transmitted by the target off-chain node, and returning the event request result to the service smart contract corresponding to the contract identifier. According to this application, a network node in the blockchain and an off-chain node outside the blockchain are connected through the oracle contract node. Data management of the service smart contract in the blockchain, and data interaction with the off-chain node are implemented by the oracle contract node. Therefore, data interaction between on-chain and off-chain in the blockchain may be implemented. In addition, the off-chain node automatically triggers the process of acquiring the event request result through the service contract information, so that the off-chain node may acquire the event request result in real time, and return the event request result to the oracle contract node in time, thereby improving real-time performance of data interaction between on-chain and off-chain in the blockchain, and further improving efficiency of blockchain message processing.

An embodiment of this application further provides a computer-readable storage medium, the computer-readable storage medium storing a computer-readable instruction, and the computer-readable instruction including a program instruction. When the program instruction is executed by the processor, the blockchain message processing method provided in the steps in FIG. 3, FIG. 5, or FIG. 6 may be implemented. For details, reference may be made to the implementations provided in the steps in FIG. 3, FIG. 5, or FIG. 6, and details are not described herein again. In addition, the description of beneficial effects of the same method is not described herein again. For technical details that are not disclosed in the embodiments of the computer-readable storage medium of this application, refer to the method embodiments of this application. In an example, the program instruction may be deployed to be executed on a computer device, or deployed to be executed on a plurality of computer devices at the same location, or deployed to be executed on a plurality of computer devices that are distributed in a plurality of locations and interconnected through a communication network. The plurality of computer devices that are distributed in the plurality of locations and interconnected through the communication network may form a blockchain network.

The foregoing computer-readable storage medium may be the blockchain message processing apparatus provided in any one of the foregoing embodiments or an internal storage unit of the foregoing computer, for example, a hard disk or an internal memory of the computer. The computer-readable storage medium may alternatively be an external storage device of the computer, for example, a removable hard disk, a smart media card (SMC), a secure digital (SD) card, or a flash card equipped on the computer. Further, alternatively, the computer-readable storage medium may include both an internal storage unit and an external storage device of the computer. The computer-readable storage medium is configured to store the computer-readable instruction and other program and data that are required by the computer. The computer-readable storage medium may further be configured to temporarily store data that has been output or data to be output.

In an embodiment, a computer device is provided, including a memory and one or more processors, the memory storing computer-readable instructions, the one or more processors, when executing the computer-readable instructions, implementing the operations in the foregoing method embodiments.

In an embodiment, one or more non-volatile computer-readable storage media storing computer-readable instructions are provided, the computer-readable instructions, when executed by one or more processors, implementing the operations in the foregoing method embodiments.

In an embodiment, a computer program product or a computer program is provided, the computer program product or the computer program including computer-readable instructions, the computer-readable instructions being stored in a computer-readable storage medium, a processor of a computer device reading the computer-readable instructions from the computer-readable storage medium, and the processor executing the computer-readable instructions, causing the computer device to perform the operations in the foregoing method embodiments.

In the specification, claims, and accompanying drawings of the embodiments of this application, the terms "first", "second" or the like are intended to distinguish between different objects but do not indicate a particular order. In addition, the term "include" and any variant thereof are intended to cover a non-exclusive inclusion. For example, a process, method, apparatus, product, or device that includes a series of operations or modules is not limited to the listed operations or modules; and instead, further optionally includes an operation or module that is not listed, or further optionally includes another operation or module that is intrinsic to the process, method, apparatus, product, or device. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

A person of ordinary skill in the art may be aware that the units and operations in the examples described with reference to the embodiments disclosed herein may be implemented by electronic hardware, computer software, or a combination thereof. To clearly describe the interchangeability between the hardware and the software, the foregoing has generally described compositions and operations of each example according to functions. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

The methods and related apparatuses provided in the embodiments of this application are described with reference to the method flowcharts and/or schematic structural diagrams provided in the embodiments of this application. Specifically, each process and/or block of the method flowcharts and/or schematic structural diagrams, and combination of processes and/or blocks in the flowcharts and/or block diagrams, may be implemented by computer-readable instructions. These computer-readable instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the schematic structural diagrams. These computer-readable instructions may also be stored in a computer readable memory that can guide a computer or another programmable data processing device to work in a specified manner, so that the instructions stored in the computer readable memory generate a product including an instruction apparatus, where the instruction apparatus implements functions specified in one or more procedures in the flowcharts and/or one or more blocks in the schematic structural diagrams. The computer-readable instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A blockchain message processing method performed by a computer device acting as an oracle contract node, the method comprising:

acquiring service contract information, and adding the service contract information to an oracle contract, the service contract information comprising a contract identifier of a service smart contract and a service request event corresponding to the service smart contract, further including:

acquiring a block chaining message of a contract block, the block chaining message comprising the service smart contract;

acquiring the contract identifier of the service smart contract;

parsing the service smart contract, to obtain the service request event, the service request event being used for representing a requested data object after the service smart contract is triggered;

generating the service contract information according to the contract identifier and the service request event;

acquiring a target service type to which the service request event belongs, and acquiring a target service data set corresponding to the target service type from the oracle contract; and adding the service contract information to the target service data set;

acquiring a target off-chain node, and transmitting the service contract information to the target off-chain node through the oracle contract, so that the target off-chain node acquires an event request result corresponding to the service request event; and acquiring the event request result transmitted by the target off-chain node, and returning the event request result to the service smart contract corresponding to the contract identifier.

2. The method according to claim 1, wherein the method further comprises:

generating a hash value of the service request event as a transaction hash; and the generating the service contract information according to the contract identifier and the service request event comprises:

generating the service contract information according to the contract identifier, the transaction hash, and the service request event.

3. The method according to claim 2, wherein the acquiring the event request result transmitted by the target off-chain node comprises:

receiving a service response message transmitted by the target off-chain node, the service response message comprising the event request result and the transaction hash; and acquiring the event request result in the service response message; and the returning the event request result to the service smart contract corresponding to the contract identifier comprises:

acquiring the transaction hash in the service response message;

determining the contract identifier corresponding to the event request result based on the transaction hash, there being an association relationship between the contract identifier and the transaction hash; and returning the event request result to the service smart contract corresponding to the contract identifier.

4. The method according to claim 1, wherein the oracle contract comprises a service mapping table, the service mapping table comprising a service type and a service data set corresponding to the service type;

the acquiring a target off-chain node, and transmitting the service contract information to the target off-chain node through the oracle contract comprises:

acquiring an off-chain node corresponding to the target service data set as the target off-chain node; and transmitting the service contract information to the target off-chain node through the oracle contract.

5. The method according to claim 1, wherein the acquiring a target off-chain node comprises:

acquiring off-chain nodes in an idle state as candidate off-chain nodes; and acquiring network quality parameters of the candidate off-chain nodes, and determining a candidate off-chain node with the highest network quality parameter as the target off-chain node.

6. The method according to claim 1, wherein the returning the event request result to the service smart contract corresponding to the contract identifier comprises:

acquiring a protocol data format corresponding to the service request event, and converting a data format of the event request result into the protocol data format, to obtain a conversion execution result; and returning the conversion execution result to the service smart contract corresponding to the contract identifier.

7. A computer device acting as an oracle contract node, comprising a memory and one or more processors, the memory storing computer-readable instructions, the computer-readable instructions, when executed by the one or more processors, causing the computer device to implement a blockchain message processing method including:

acquiring service contract information, and adding the service contract information to an oracle contract, the service contract information comprising a contract identifier of a service smart contract and a service request event corresponding to the service smart contract, further including:

acquiring a block chaining message of a contract block, the block chaining message comprising the service smart contract;

acquiring the contract identifier of the service smart contract;

parsing the service smart contract, to obtain the service request event, the service request event being used for representing a requested data object after the service smart contract is triggered;

generating the service contract information according to the contract identifier and the service request event;

acquiring a target service type to which the service request event belongs, and acquiring a target service data set corresponding to the target service type from the oracle contract; and adding the service contract information to the target service data set;

acquiring a target off-chain node, and transmitting the service contract information to the target off-chain node through the oracle contract, so that the target off-chain node acquires an event request result corresponding to the service request event; and acquiring the event request result transmitted by the target off-chain node, and returning the event request result to the service smart contract corresponding to the contract identifier.

8. The computer device according to claim 7, wherein the method further comprises:

generating a hash value of the service request event as a transaction hash; and the generating the service contract information according to the contract identifier and the service request event comprises:

generating the service contract information according to the contract identifier, the transaction hash, and the service request event.

9. The computer device according to claim 8, wherein the acquiring the event request result transmitted by the target off-chain node comprises:
receiving a service response message transmitted by the target off-chain node, the service response message comprising the event request result and the transaction hash; and
acquiring the event request result in the service response message; and
the returning the event request result to the service smart contract corresponding to the contract identifier comprises:
acquiring the transaction hash in the service response message;
determining the contract identifier corresponding to the event request result based on the transaction hash, there being an association relationship between the contract identifier and the transaction hash; and
returning the event request result to the service smart contract corresponding to the contract identifier.

10. The computer device according to claim 7, wherein the oracle contract comprises a service mapping table, the service mapping table comprising a service type and a service data set corresponding to the service type;
the acquiring a target off-chain node, and transmitting the service contract information to the target off-chain node through the oracle contract comprises:
acquiring an off-chain node corresponding to the target service data set as the target off-chain node; and
transmitting the service contract information to the target off-chain node through the oracle contract.

11. The computer device according to claim 7, wherein the acquiring a target off-chain node comprises:
acquiring off-chain nodes in an idle state as candidate off-chain nodes; and
acquiring network quality parameters of the candidate off-chain nodes, and determining a candidate off-chain node with the highest network quality parameter as the target off-chain node.

12. The computer device according to claim 7, wherein the returning the event request result to the service smart contract corresponding to the contract identifier comprises:
acquiring a protocol data format corresponding to the service request event, and converting a data format of the event request result into the protocol data format, to obtain a conversion execution result; and
returning the conversion execution result to the service smart contract corresponding to the contract identifier.

13. One or more non-transitory computer-readable storage media storing computer-readable instructions, the computer-readable instructions, when executed by one or more processors of a computer device acting as an oracle contract node, causing the computer device to implement a blockchain message processing method including:
acquiring service contract information, and adding the service contract information to an oracle contract, the service contract information comprising a contract identifier of a service smart contract and a service request event corresponding to the service smart contract, further including:
acquiring a block chaining message of a contract block, the block chaining message comprising the service smart contract;
acquiring the contract identifier of the service smart contract;
parsing the service smart contract, to obtain the service request event, the service request event being used for representing a requested data object after the service smart contract is triggered;
generating the service contract information according to the contract identifier and the service request event;
acquiring a target service type to which the service request event belongs, and acquiring a target service data set corresponding to the target service type from the oracle contract; and
adding the service contract information to the target service data set;
acquiring a target off-chain node, and transmitting the service contract information to the target off-chain node through the oracle contract, so that the target off-chain node acquires an event request result corresponding to the service request event; and
acquiring the event request result transmitted by the target off-chain node, and returning the event request result to the service smart contract corresponding to the contract identifier.

14. The non-transitory computer-readable storage media according to claim 13, wherein the method further comprises:
generating a hash value of the service request event as a transaction hash; and
the generating the service contract information according to the contract identifier and the service request event comprises:
generating the service contract information according to the contract identifier, the transaction hash, and the service request event.

15. The non-transitory computer-readable storage media according to claim 13, wherein the oracle contract comprises a service mapping table, the service mapping table comprising a service type and a service data set corresponding to the service type;
the acquiring a target off-chain node, and transmitting the service contract information to the target off-chain node through the oracle contract comprises:
acquiring an off-chain node corresponding to the target service data set as the target off-chain node; and
transmitting the service contract information to the target off-chain node through the oracle contract.

16. The non-transitory computer-readable storage media according to claim 13, wherein the acquiring a target off-chain node comprises:
acquiring off-chain nodes in an idle state as candidate off-chain nodes; and
acquiring network quality parameters of the candidate off-chain nodes, and determining a candidate off-chain node with the highest network quality parameter as the target off-chain node.

17. The non-transitory computer-readable storage media according to claim 13, wherein the returning the event request result to the service smart contract corresponding to the contract identifier comprises:
acquiring a protocol data format corresponding to the service request event, and converting a data format of the event request result into the protocol data format, to obtain a conversion execution result; and
returning the conversion execution result to the service smart contract corresponding to the contract identifier.

* * * * *